US006952726B1

(12) United States Patent
White et al.

(10) Patent No.: US 6,952,726 B1
(45) Date of Patent: Oct. 4, 2005

(54) AUTOMATIC JOB RESOURCE USAGE AND RETRIEVAL

(75) Inventors: Craig R. White, Eagle, ID (US); Binnur Al-Kazily, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/384,839

(22) Filed: Aug. 27, 1999

(51) Int. Cl.[7] .............................. G06F 11/30; G06F 3/12
(52) U.S. Cl. ........................ 709/224; 709/226; 709/232; 707/500; 358/1; 714/46; 370/85
(58) Field of Search ................................ 709/224, 226, 709/223, 232; 707/500; 358/1; 714/46; 370/85

(56) References Cited

U.S. PATENT DOCUMENTS

| | | | | |
|---|---|---|---|---|
| 5,220,674 A | * | 6/1993 | Morgan et al. | 395/800 |
| 5,323,393 A | * | 6/1994 | Barrett et al. | 370/85.8 |
| 5,754,767 A | * | 5/1998 | Ruiz | 395/200.5 |
| 5,935,262 A | * | 8/1999 | Barrett et al. | 714/46 |
| 5,987,226 A | * | 11/1999 | Ishikawa et al. | 395/112 |
| 6,175,839 B1 | * | 1/2001 | Takao et al. | 715/500 |
| 6,515,756 B1 | * | 2/2003 | Mastie et al. | 358/1.15 |

FOREIGN PATENT DOCUMENTS

| | | | | |
|---|---|---|---|---|
| EP | 0917042 A2 | * | 5/1999 | G06F/3/12 |
| GB | 2331387 A | | 5/1999 | |
| GB | 2331387 A | * | 5/1999 | |

OTHER PUBLICATIONS

LAN Attached and UNIX Printing for VINES, Administrators Manual, Incognito Software Inc, ver. 4.2, 1996, pp. 9–22 and 48–58.*

"LAN Attached and UNIX Printing for VINES", Administrators Manual, Incognito Software Inc, ver.4.2, 1996, pp. 9–22 and 48–58.

UK Search Report.

* cited by examiner

*Primary Examiner*—David Wiley
*Assistant Examiner*—Alina Boutah

(57) ABSTRACT

A method and system for monitoring resource usage in a networked computer system that includes client systems, a resource server and system resources accessible to the resource server. A client system issues a resource job requiring use of a system resource wherein the resource job includes job instructions directing the resource to perform an operation and job data to be operated upon by the resource in performing the operation. The client system forwards the resource job to the resource server, which directs the job instructions and job data to a resource that returns corresponding job result information to the resource server. A job processor in the resource server forwards the resource job to the resource and extracts job attribute information identifying system resources to be used in executing the resource job. A resource agent in the resource server forwards the job attribute information and job result information to a collection server wherein the job result information identifies the results achieved by the resource. The collection server generates job detail information representing system resources used in executing the resource job from the job attribute information and the job result information and stores the job details in a database. A resource manager system communicating with the collection server may then read the job details from the database and provide the job details to a user of the resource manager system for use in monitoring usage of systems resources.

25 Claims, 2 Drawing Sheets

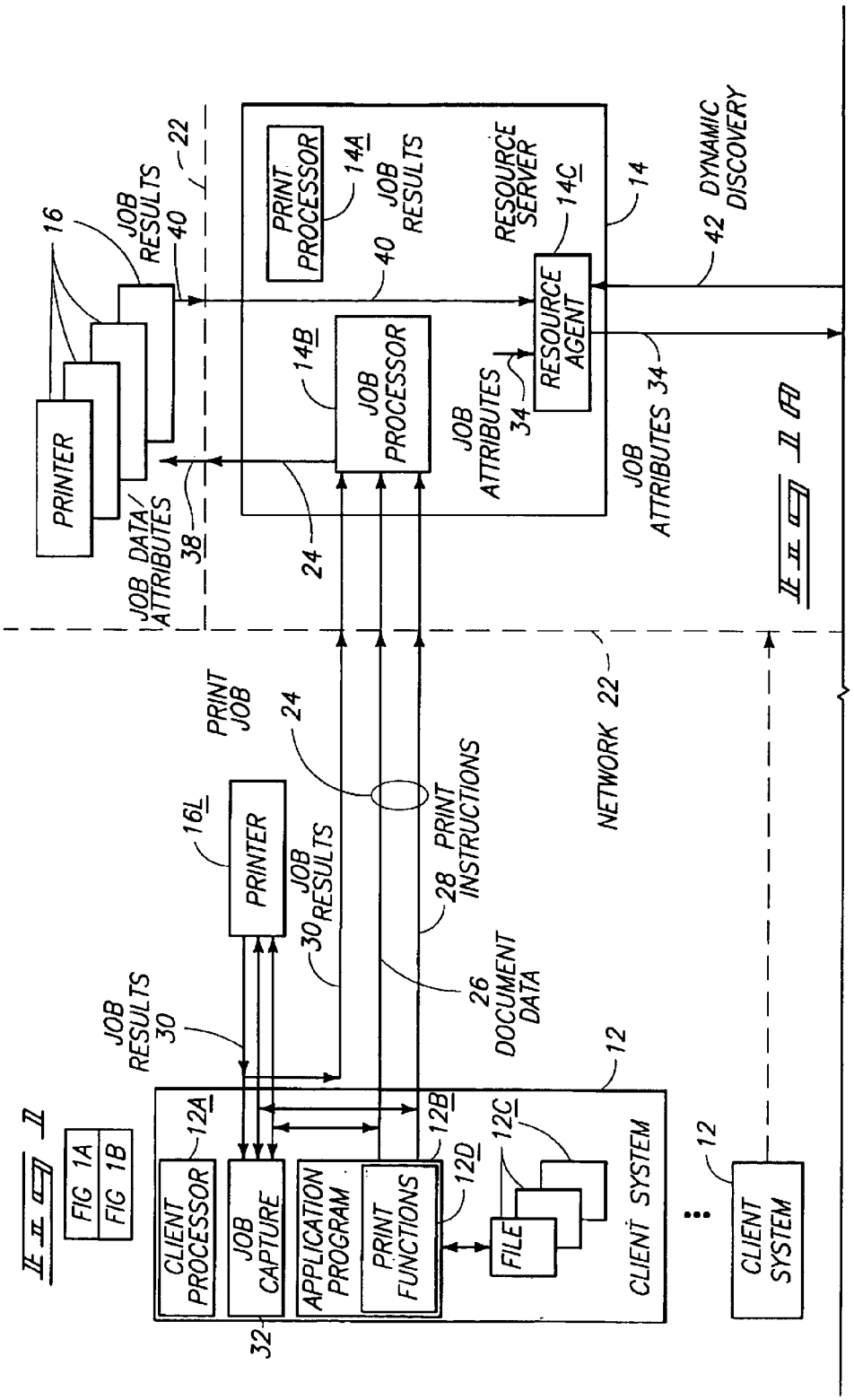

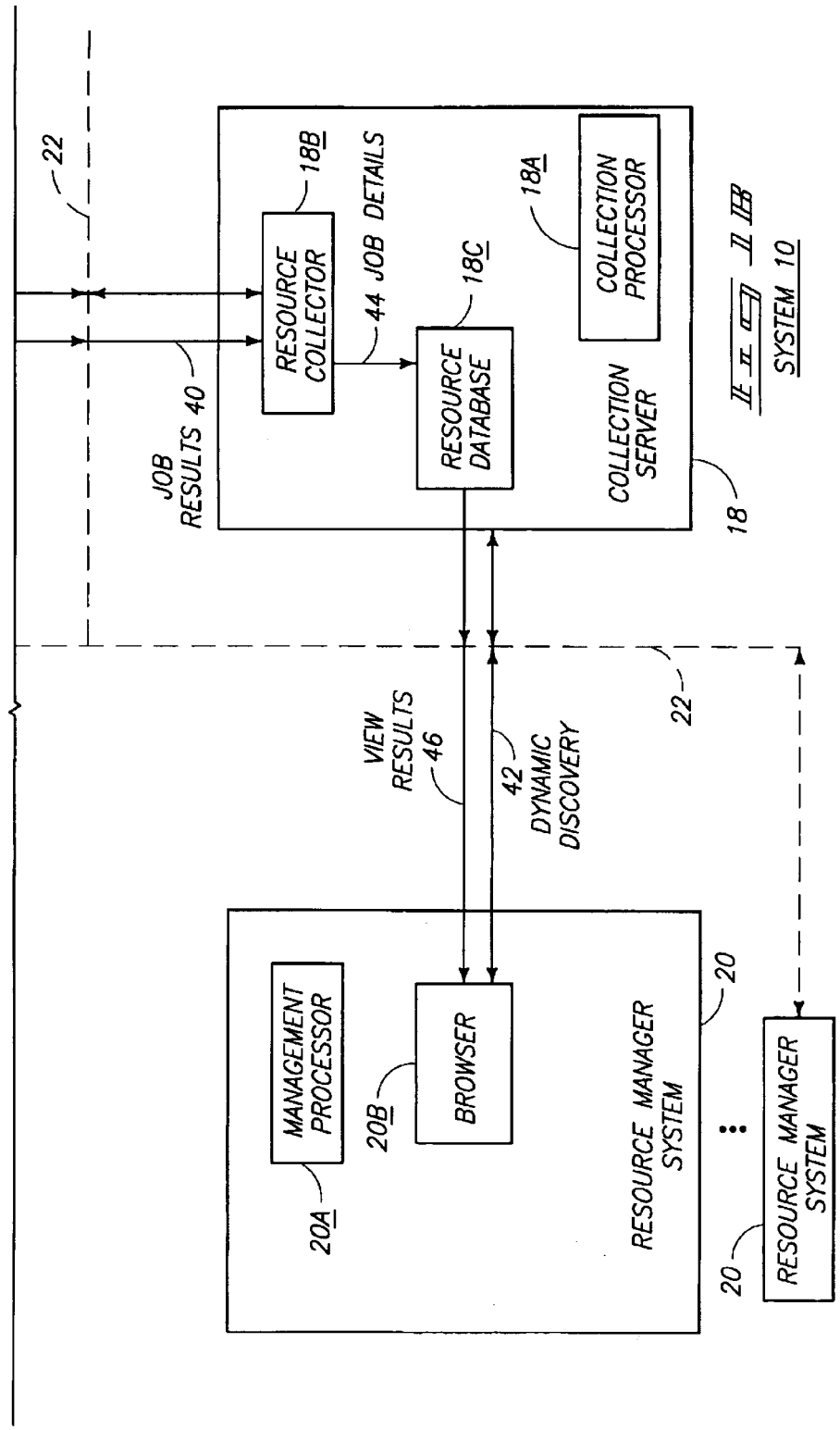

AUTOMATIC JOB RESOURCE USAGE AND RETRIEVAL

FIELD OF THE INVENTION

The present invention relates to a method and system for monitoring and recording the usage of resources on a system and, in particular, for monitoring and recording the usage of resources, such as print facilities, in a networked system.

BACKGROUND OF THE INVENTION

A common historical feature of virtually all cooperative enterprises, such as a business, group of businesses or business divisions, or governmental or administrative organization of any form, is the sharing of resources among the individuals or groups of individuals therein. It is well known and accepted that the sharing of resources among users reduces the per user cost of the resources, including supply and maintenance costs, and allows a greater range of resources to be made available to the users.

The sharing of resources is a common feature of computer systems and, in particular, is one of the primary reasons for networked computers systems wherein the users share such facilities as storage devices, communications networks, printers, and even applications programs and data files. The sharing of resources, such as supplies and maintenance services, however, is also of benefit for standalone systems used by the members of an organization or group.

To obtain the optimum benefit from shared resources, it is necessary to monitor the usage of the resources to insure that the types, number and capacities of the resources correspond to the needs of the user so that the work of the users is not hampered by lack of a resource and to insure that resources are not underutilized. Such monitoring also allows the efficient scheduling of supplies and maintenance, and can assist in insuring that the resources are used properly for the intended purposes.

The monitoring of resource usage is, however, a persistent problem in contemporary computer systems as the systems are not designed to, and do not, provide the facilities to provide the necessary information in a form and manner to be efficiently and effectively used by a resource administrator. For example, one of the most common shared resources in networked computer systems is printers which, in networked computer systems, are typically connected from a print server system that is accessible to the users of other systems in the network through the network. While print servers and most printers include a spooler mechanism that manages the flow of print jobs through the printer and that generates data pertaining to the jobs, the data is generally inadequate for effective monitoring of the printer usage. That is, the data generated by a print spooler usually records only that a print job was completed or failed, may indicate the date and time a job was submitted or a queue number assigned to the job by the spooler, and may include error messages. In addition, the data normally must be collected from each print server or printer individually and by hand, and the data from individual printers must then collated and merged by hand to provide an overview of printer use in, for example, a department of a corporation. While other types of resources, such as file servers and network controllers, may provide more detailed usage information and may make the information accessible through the network, there are many that have little better facilities for monitoring than are typically provided in printers and print servers.

The present invention provides a solution to these and other problems of the prior art.

SUMMARY OF THE INVENTION

The present invention is directed to a method and system for monitoring resource usage in a networked computer system. The networked system includes at least one client system, a resource server and at least one system resource accessible to the resource server and the client systems and the resource server are interconnected by a communications network. A client system includes a processor for executing an application program for issuing a resource job requiring use of a system resource wherein a resource job includes job instructions directing the resource to perform an operation and job data to be operated upon by the resource in performing the operation. The client system forwards the resource job to the resource server, which responds by directing the job instructions and job data to a resource accessible to the resource server. The resource in turn responds to the job instructions and job data by returning corresponding job result information to the resource server.

According to the present invention, in the resource server a job processor forwards the resource job to the resource and extracts job attribute information from the resource job wherein the job attribute information includes information identifying system resources to be used in executing the resource job. A resource agent in the resource server receives the job attribute information from the job processor and job result information returned from the resource, wherein the job result information identifies the results achieved by the resource in response to the resource job, and forwards the job attribute information and job result information to a collecting server.

A resource collector in the collecting server receives the job attribute information and the job result information, generates corresponding job detail information representing system resources used in executing the resource job and stores the job details in a database. A resource manager system communicating with the collecting server through the network may then read the job details from the database and provide the job details to a user of the resource manager system for use in monitoring usage of systems resources.

In further embodiments of the invention, the resource agent includes a dynamic discovery function for identifying a current location of a current resource collector on the network and transmitting job attribute information and job result information to the current collecting server. The system resource manager may also include a dynamic discovery function for identifying a current location of a current collecting server on the network and reading job details from the database in the current collecting server.

In still further implementations of the invention, a client system may include a local resource accessible to the client system and the client system may transmit the job instructions and job data of a resource job to the local resource. The client system will includes a job capture mechanism for capturing the job instructions and job data transmitted to the local resource and job result information returned by the local resource, extracting the job attribute information from the captured job instructions and job data, and forwarding the job attribute information and job result information to the resource server. Alternately, the capture mechanism may forward the job instructions, job data and job result information to the resource server.

In a presently preferred embodiment of the invention, which is discussed in detail herein, the resources being monitored are printers, so that the resource jobs are print jobs and the job instructions and job data of the resource jobs are printing instructions and document data.

DESCRIPTION OF THE DRAWINGS

The foregoing and other objects, features and advantages of the present invention will be apparent from the following description of the invention and embodiments thereof, as illustrated in the accompanying figures, wherein:

FIG. 1 is a map showing how FIGS. 1A–1B are to be assembled. After assembly, FIGS. 1A–1B provide a block diagram of a networked system incorporating the present invention.

DETAILED DESCRIPTION OF THE INVENTION

As will be described in the following, FIGS. 1A and 1B illustrate the present invention for a typical and illustrative exemplary embodiment of the present invention providing usage monitoring of shared printing resources in a networked system.

As represented in FIGS. 1A and 1B, a System 10 may typically include one or more Client Systems 12, a Resource Server 14, one or more Printers 16, an Collection Server 18 and a Resource Management System 20, all of which are interconnected and communicate through a Network 22. It will be understood by those of ordinary skill in the relevant arts and for purposes of the following discussion, although not shown or discussed in further detail herein, that Network 22 may be embodied in many forms, such as the Internet, a proprietary network, a local or wide area network of any form, hard-wire connections between components of System 10, or a combination thereof. It will also be understood that the components of System 10, such as Client Systems 12, Resource Server 14, Collection Server 18 and Resource Manager System 20, will include the facilities, such as network drivers and interfaces and communication control and protocol programs, necessary to communicate through Network 22.

As indicated, each Client System 12 includes a Client Processor 12A, such as a personal computer or a terminal served by an application program/file server system, wherein each Client Processor 12A is connected to Network 22 and executes at least one Application Program 12B to perform operations on documents of various forms and formats, including issuing instructions for printing documents upon command by the user of Client System 12. In a typical networked environment as illustrated in FIGS. 1A and 1B, Client Systems 12 will transmit Print Jobs 24, that is, documents to be printed and information related to the printing of the documents, to Resource Server 14 through Network 22.

As represented in FIGS. 1A and 1B, a Print Job 24 is comprised to two primary components, indicated in FIGS. 1A and 1B as Document Data 26 and Print Instructions 28. Document Data 26 is essentially comprised of the document to be printed and will include, at the minimum and for example, a text or graphic file or a file containing a combination of text and graphics, indicated as Document (Doc) File 12C. Document Data 26 will typically include other information describing the internal characteristics of the file or document, depending upon characteristics of the Application Program 12B and the file management services included in, for example, the operating system functions of Client System 12. Document Data 26 may, for example, further include such information as the file name, size and type, author and creation or editing date, document formatting information such as page size, margins, number of pages, font type and size, header and footer information, text and graphics color specifications or definitions, and so on.

Print Instructions 28, in turn, are essentially comprised of the information necessary to direct a Printer 16 in printing the Document Data 26 according to the requirements of the Print Job 24 and the information therein, as generated by a Client System 12, will depend upon the specific nature, capabilities and functions of Application Program 12B and, in particular, the capabilities and features of Print Control Functions 12D that may be included in either or both of the Application Program 12B and the print services included in, for example, the operating system functions of Client System 12. Print Instructions 28 may include, for example, number of copies to the printed, a printer or system to execute the job, various materials to be used in printing selected pages of the document, such as letterhead, plain bond, paper of selected colors, or transparency films, which may be identified by material type or by paper tray in the printer, depending upon the intelligence incorporated in the Printer 16 or Resource Server 14, colors to be used for various texts, single or double sided printing, collation, binding, and so on.

It will be understood that in some systems a Client System 12 may transmit the Document Data 26 and the Print Instructions 28 of a Print Job 24 in the form of a single entity, such as a job print file structure. In other systems, a Client System 12 may transmit the Document Data 26 and Print Instructions 28 as separate but associated entities, for example, by linking the Document Data 26 and Print Instructions 28 through a common job identifier. It will also be understood that one or more Client Systems 12 of System 10 may function as file servers to store and provide files, including document files to be printed, under the direction of the Client Systems 12 executing Application Programs 12B. In this instance, a Print Job 24 as issued by a Client System 12 may be in the form of Print Instructions 28 and a request to a Client System 12 operating as a file server to provide the Document Data 26, that is, a document file, to Resource Server 14, whereupon the Client System 12 operating as a file server will be the actual source of the Document Data 26 of the Print Job 24. As will be described below with regard to Resource Server 14, however, the present invention is readily adaptable to the specific form in which a Print Job 24 is transmitted to Resource Server 14, and such adaptations will be well understood by those of ordinary skill in the relevant arts after the following discussion of a Resource Server 14.

In addition, it will be understood that in some implementations of a System 10 at least some Client Systems 12 may be connected directly to a dedicated local Printer 16L wherein the usage of such local Printers 16L is to be monitored by the system of the present invention in a manner similar to the usage monitoring of shared Printers 16. In such instances, an example of which is illustrated in FIGS. 1A and 1B and the operation of which will be well understood by those of ordinary skill in the arts, the Document Data 26 and Print Instructions 28 of a Job 24 will be sent directly to the associated Printer 16L by the Client System 12, either by direct connection or, for example, through a Network 22. The Printer 16L will respond with Job Results 30 wherein Job Results 30 will typically, and at a minimum, include a message whether the Job 24 was completed or failed to be printed, sometimes with an error/diagnostic message, and may include such information as a Job 24 identifier and the times of receipt and completion of the Job 24. A Job Results 30 may also include other information, such as the amounts of printing media and paper used. In this case, the Client System 12 will additionally include a Job Capture Mechanism (Job Capture) 32, which is typically implemented as a small program or utility that monitors print commands to the Printer 16L and captures, that is, copies or records, the Document Data 26 and Print Instructions 28 sent to the Printer 16 and the Job Results 30 returned by the Printer 16L. Job Capture 32 then forwards all or part of Document Data 26, Print Instructions 28 and Job Results 30 to Resource Server 14 to be used in monitoring the usage of the Printer 16L. As the construction and operation of such monitor and capture routines are well known to those of ordinary skill in the arts, the detailed operation of Job Capture 32 need not be discussed in further detail herein.

At this point, it should be noted that the information that is regarded as necessary or desirable to monitor the usage of a resource such as a Printer 16 in any particular system or application will typically not include all of the information that is forwarded to the resource to control the operation of the resource. For example, in most situations it is not necessary to capture the actual contents of documents in order to monitor the usage of printers. In addition, the information generated by a Client System 12 to control a resource, such as the information in the Document Data 26 and Print Instructions 28 of a Print Job 24, is not necessarily organized and structured in a form that is most useful for resource usage monitoring. In the present exemplary embodiment of the invention, for example, the desired resource usage information, which is identified in FIGS. 1A and 1B in Resource Server 14 as Job Attributes 34, may typically include part or all of the information contained in Print Instructions 28 but may also include information from Document Data 26, depending on the form in which Document Data 26 and Print Instructions 28 are generated by the Client System 12. For example, Job Attributes 34 may desirably include such information as the document file name, size and type, author, creation or editing date, document formatting, print color specifications, and so on, and some of this information may reside in Document Data 26 rather than in Print Instructions 28. For these reasons, it will be recognized that it will often be necessary, in any particular implementation of a System 10 incorporating the present invention, to extract the desired resource usage monitoring information, that is, Job Attributes 34, from the information that is generated by the Client Systems 12 to control the resources.

In, for example, those instances wherein a document is printed by a Printer 16L that is directly associated with a Client System 12, it will be recognized that it is not necessary to send the actual document file, that is, the actual contents of the document, to Resource Server 14. It is sufficient, for resource usage monitoring purposes, to send only the Job Attribute 34 information to a Resource Server 14. For this reason, the Job Capture 32 residing in a Client System 12 may include routines or utilities to extract the desired information from either or both of Document Data 26 and Print Instructions 28, format this information into a Job Attributes 34, and forward the Job Attributes 34 and the corresponding Job Results 30 to Resource Server 14. In the alternative, and depending upon the choices of the designer, Job Capture 32 may simply capture the Document Data 26, Print Instructions 28 and Job Results 30 and forward this information to Resource Server 14 with, for example, an attached or associated designator that the document is not to be actually printed and that the information is for usage monitoring purposes only. Again, the construction of routines to extract and compile information from known information structures or formats and into another format is well understood by those of ordinary skill in the arts and need not be discussed in further detail herein.

Lastly with respect to Client Systems 12, it should be noted that a Client System 12 may forward resource usage information, such as the Job Attributes 34 and Job Results 30 generated for or by a local Printer 16L, directly to Collection Server 18 rather than to Resource Server 14 if the information is in a form suitable for use by Collection Server 18. In a presently preferred embodiment of a System 10, however, as described below, Resource Server 14 operates as a network communications node between the Client Systems 12 connected from Resource Server 14 and Collection Server 18 and all resource usage information is routed to Collection Server 18 through Resource Server 14.

Next considering Resource Server 14 and Printers 16, as shown in FIGS. 1A and 1B Resource Server 14 includes a Print Processor 14A, again such as a personal computer or a network server processor, wherein Resource Server 14 includes a Job Processor 14B and a Resource Agent 14C that are connected to Network 22, either directly or through Print Processor 14A and through a Network 22 interface device and the appropriate network protocol. It will be understood that Job Processor 14B and Resource Agent 14C may be implemented in Print Processor 14A, for example, by programs executing in Print Processor 14A, or as dedicated function processors controlled by a Print Processor 14A. In addition, and as shown, Resource Server 14 is connected to one or more Printers 16, either directly or through Network 22, and to Collection Server 18 through Network 22.

Upon receiving a Print Job 24 from a Client System 12, Job Processor 14B forwards the print job, that is, the contents of the document and the instructions, commands and information necessary to control the printing of the document to one or more Printers 16 as a Job Data/Attributes 38. It will be apparent that the characteristics of Job Data/Attributes 38 will depend on the requirements of Print Jobs 24 and the capabilities and characteristics of Printers 16. In this regard, it should be noted that Printers 16 connected from Resource Server 14 may, depending upon the particular System 10, be comprised of a single Printer 16 or group of individual Printers 16 controlled directly by Resource Server 14 or a complex of Printers 16 with a printer controller communicating with Resource Server 14. It will also be recognized that each of the Printers 16 in a group of individual printers or a complex of printers may have different characteristics and capabilities. For example, some of Printers 16 may have color capability while others may be provided with different types and sizes of print media, such as plain or letterhead paper or transparency films and different sizes and colors of paper. The printing instruction processing and self-control capabilities of Printers 16 or the printer controller may also differ. Some printers or printer controllers, for example, may be capable of translating Document Data 26 and Print Instructions 28 or Job Attributes 34 directly. Others may require that complex documents be broken into separate jobs and directed to different printers according to page type or printing characteristics, and detailed instructions, such as the paper trays to be used for each type of page. In some implementations of a System 10, therefore, Document Data 26 and Print Instructions 28 or Job Attributes 34 may be used directly by Printers 16 while in other implementations some or all of Document Data 26, Print Instructions 28, or Job Attributes 34 may unsuitable for direct control of Printers 16. Job Processor 14B may therefore additionally include routines for extracting the document data and printing instructions or commands necessary to control Printers 16 from a Print Job 24 and translating the document data, instructions and commands into a Job Data/Attributes 38 suitable for use by Printers 16. Again, the construction of routines to extract and compile information from known information structures or formats and into other formats, such as translating Document Data 26 and Print Instructions 28 into Job Attributes 34 or Job Data/Attributes 38, is well understood by those of ordinary skill in the arts and need not be discussed in further detail herein.

As indicated in FIGS. 1A and 1B, Printers 16 will, upon completion of each Print Job 24, return a corresponding Job Results 40 to Resource Server 14 in the manner described above with respect to a Printer 16L and Job Results 30 and Resource Server 14 will forward Job Results 40 to Collection Server 18 with the corresponding Job Attributes 34. As described with respect to Job Results 30, a Job Results 30 will typically, and at a minimum, include a message whether the Print Job 24 was completed or failed to be printed and may include, for example, error/diagnostic messages, a job identifier, the times of receipt and completion of the job, and information such as the amounts of printing media and paper used, depending upon the capabilities of the printers or printer controller.

As described above, Resource Server 14 also collects and forwards to Collection Server 18 resource usage information pertaining to the resources associated with Resource Server 14, that is, Printers 16, as print jobs are performed. As also described, the desired resource usage information will typically not include all of the information that must be sent to the resource, and the information as sent to a resource may not be in a form that is most useful for resource usage monitoring. For these reasons, Job Processor 14B processes the information sent to the resources, such as Document Data 26 and Print Instructions 28, as necessary to extract the information comprising Job Attributes 34 and organizes the information into a corresponding Job Attributes 34. Resource Server 14 then forwards each Job Attributes 34 to Resource Agent 14C with the corresponding Job Results 40. Again, the construction of routines to extract and compile information from known information structures or formats and into other formats, such as translating Document Data 26 and Print Instructions 28 into Job Attributes 34, is well understood by those of ordinary skill in the arts and need not be discussed in further detail herein.

In addition, it has been described above that a Client System 12 may generate and forward the Job Attributes 34 and Job Results 30 of a Printer Job 24 executed on a local Printer 16L to Resource Server 14, or may simply forward the Document Data 26, Print Instructions 28 and Job Results 30 to Resource Server 14. If the information pertaining to locally executed Print Jobs 24 is not directly usable as usage monitoring information by Collection Server 18, it will be processed by Job Processor 14B, which will generate corresponding Job Attributes 34 and, if necessary, a corresponding Job Results 40. Again, the construction of routines to extract and compile information from known information structures or formats and into other formats is well understood by those of ordinary skill in the arts and need not be discussed in further detail herein.

As represented in FIGS. 1A and 1B, Job Attributes 34 and Job Results 40 generated by Job Processor 14B as a consequence of Print Jobs 24 sent to Printers 16 and 16L are provided to Resource Agent 14C, which in turn communicates Job Attributes 34 and Job Results 40 to Collection Server 18 through Network 22. It will be understood that Collection Server 18 may be located locally to Resource Server 14, so that the Network 22 connection between Resource Server 14 and Collection Server 18 is implemented through wired connections or, more usually, a local area network. Collection Server 18 may, however, be located remotely from Resource Server 14 and the Network 22 providing network communications between Resource Server 14 and Collection Server 18 may be implemented through a wide area network, such as the Internet. In addition, and while Collection Server 18 may be implemented in a dedicated, fixed system or network node, it is anticipated that the logical or physical location of Collection Server 18 may change from time to time, or there may be several Resource Servers 14, each of which may be used at certain times or each of which may be used to monitor different resources. For this reason, in the presently preferred embodiment Resource Agent 14C incorporates a Dynamic Discovery Mechanism (Dynamic Discovery) 42 to allow Resource Agent 14C to determine, at any time, the current location of Collection Server 18 in Network 22. In Systems 10 wherein Network 22 is the Internet, for example, Dynamic Discovery 42 may be implemented through an Internet browser. In systems interconnected through other types of networks, Dynamic Discovery 42 will be implemented using the network address seek mechanism native to those systems, as will be familiar to those of ordinary skill in the relevant arts.

Referring to Collection Server 18, as indicated in FIGS. 1A and 1B Collection Server 18 includes an Collection Processor 18A, which may be implemented, for example, by a personal computer or other processor or computer having the necessary capabilities, a Resource Collector 18B and a Resource Database 18C. The database supported by Resource Database 18C will typically reside in a mass storage device, such as a disk drive, and the database management functions of Resource Database 18C will typically be implemented by programs executing in Collection Processor 18A. The functions of Resource Collector 18B, which will include a Network 22 interface device, may likewise be implemented by programs executing in Collection Processor 18A or may be implemented as dedicated as a function processor controlled by Collection Processor 18A.

As shown, Resource Collector 18B is connected to Network 22 to communicate with one or more Printer Servers 14 or equivalent resource servers in System 10, with the initial communications being established through Dynamic Discovery 42 mechanism and Resource Collector 18B thereafter receiving resource usage information such as Job Attributes 34 and Job Results 40 from the Resource Server 14 or an equivalent other server. Resource Collector 18B receives, collects and collates or otherwise processes Job Attributes 34 and Job Results 40 as necessary for the information to be stored in Resource Database 18C and provides the resource usage monitoring information to Resource Database 18C as Job Details 44.

It is apparent that the resource usage monitoring information represented in Job Details 44 in Resource Database 18C may be read therefrom and used as desired by a user of Collection Processor 18A. In a presently preferred embodiment of a System 10, however, it is anticipated that one or more users who may be located remotely from the System 10 will wish to access and use the resource usage monitoring information residing in Resource Database 18C. For this reason, and as indicated in FIGS. 1A and 1B, Resource Database 18C is accessible through Network 22 through an appropriate network interface device and the appropriate network communication protocols, which may be executed under control or programs executing in Collection Processor 18A. Such remote users are indicated in FIGS. 1A and 1B as the users of one or more Resource Manager Systems 20, wherein each Resource Management System 20 includes a Management Processor 20A, which may be implemented as a personal computer or a network server processor, and an appropriate Network 22 interface device for executing Network 22 communications protocols. The Network 22 interface of a Resource Manager System 20 is represented in FIGS. 1A and 1B as Browser 20B, which typically operates under control of programs executing in Management Processor 20A. As indicated in FIGS. 1A and 1B, Browser 20B incorporates a Dynamic Discovery Mechanism (Dynamic Discovery) 42 to allow Resource Manager System 20 to determine, at any time, the current location of Collection Server 18 in Network 22 and to communicate with Collection Server 18. In particular, Browser 20B includes the facility, represented as View Results 46, to access and view the resource usage monitoring information residing in Resource Database 18C, typically by communicating with the database management program executing in Collection Processor 18A.

It will therefore be apparent from the above description of the present invention that the present invention provides a method and system for obtaining and collecting resource usage information and for making such information available in a form suitable for planning and managing the efficient use of resources. It will also be apparent to those of ordinary skill in the relevant arts that while the invention has been particularly shown and described with reference to preferred embodiments of the apparatus and methods thereof, various changes, variations and modifications in form, details and implementation may be made therein without departing from the spirit and scope of the invention as defined by the appended claims, certain of which have been described herein above. It will be recognized, for example, that the present system resource usage monitoring system may be used to monitor system resources other than printers, or in addition to printers, such as the usage of file servers and communications facilities. Therefore, it is the object of the appended claims to cover all such variation and modifications of the invention as come within the true spirit and scope of the invention.

What is claimed is:

1. In a networked computer system including at least one client system, a resource server and at least one system resource accessible to the resource server wherein the at least one client system and the resource server are interconnected by a communications network and wherein a client system includes a processor for executing an application program for issuing a resource job including job instructions directing a resource to perform an operation and job data to be operated upon by the resource in performing the operation to the resource server, the resource server being responsive to a resource job for directing the job instructions and job data to a resource accessible to the resource server and the resource being responsive to the job instructions and job data for returning corresponding job result information to the resource server, a system resource usage monitoring system, comprising:

in the resource server, a job processor for forwarding the job instructions and job data of a resource job to a resource accessible to the resource server, and extracting job attribute information from the resource job wherein the job attribute information includes information identifying system resources to be used in executing the resource job, a resource agent for receiving job attribute information from the job processor and job result information returned from the resource wherein the job result information identifies the results achieved by the resource in response to the resource job, and forwarding the job attribute information and the job result information to a collecting server, the collecting server including a resource collector for receiving the job attribute information and the job result information and generating corresponding job detail information representing system resources used in executing the resource job, and a database for storing the job details.

2. The resource usage monitoring system of claim 1, further comprising:

a resource manager system communicating with the collecting server through the network for reading the job details from the database and providing the job details to a user of the resource manager system for monitoring resource usage.

3. The resource usage monitoring system of claim 1, wherein:

the resource agent includes a dynamic discovery function for identifying a current location of a current resource collector on the network and transmitting job attribute information and job result information to the current collecting server.

4. The resource usage monitoring system of claim 1, wherein:

the system resource manager includes a dynamic discovery function for identifying a current location of a current collecting server on the network and reading job details from the database in the current collecting server.

5. The resource usage monitoring system of claim 1, wherein:

a client system further includes a local resource accessible to the client system, wherein the client system transmits the job instructions and job data of a resource job to the local resource, and a job capture mechanism for capturing the job instructions and job data transmitted to the local resource and job result information returned by the local resource, extracting the job attribute information from the captured job instructions and job data, and forwarding the job attribute information and job result information to the resource server.

6. The resource usage monitoring system of claim 1, wherein:

a client system further includes a local resource accessible to the client system, wherein the client system transmits the job instructions and job data of a resource job to the local resource, and a job capture mechanism for capturing the job instructions and job data transmitted to the local resource and job result information returned by the local resource, and forwarding the job instructions, job data and job result information to the resource server.

7. The resource usage monitoring system of claim 1, wherein the job result information comprises an indication that the resource job has been successfully imaged.

8. The resource usage monitoring system of claim 1, wherein the job result information comprises a message indicating a time of receipt of the resource job by the resource.

9. The resource usage monitoring system of claim 1, wherein the job result information comprises a message indicating a time of completion of imaging of the resource job.

10. The resource usage monitoring system of claim 1, wherein the job result information comprises information regarding an amount of a consumable used to image the resource job.

11. In a networked computer system including at least one client system, a resource server and at least one system resource accessible to the resource server wherein the at least one client system and the resource server are interconnected by a communications network and wherein a client system includes a processor for executing an application program for issuing a resource job including job instructions directing a resource to perform an operation and job data to be operated upon by the resource in performing the operation to the resource server, the resource server being responsive to a resource job for directing the job instructions and job data to a resource accessible to the resource server and the resource being responsive to the job instructions and job data for returning corresponding job result information to the resource server, a method for monitoring usage of system resources, comprising the steps of:

forwarding a resource job to the resource server, forwarding the job instructions and the job data of a resource job from the resource server to a resource accessible to the resource server, extracting job attribute information from the resource job wherein the job attribute information includes information identifying system resources to be used in executing the resource job, returning job result information from the resource receiving the resource job to the resource server wherein the job result information identifies the results achieved by the resource in response to the resource job, forwarding the job attribute information and job result information returned from the resource to a collecting server, generating corresponding job detail information representing system resources used in executing the resource job, and storing the job details in a database.

12. The method for monitoring usage of system resources of claim 11, further comprising the steps of:

communicating with the collecting server through the network for reading the job details from the database and reading the job details to a user of a resource manager system for use in monitoring resource usage.

13. The method for monitoring usage of system resources of claim 11, further comprising the steps of:

executing a dynamic discovery function to identify a current location of a current collecting server on the network and transmitting job attribute information and job result information to the current collecting server.

14. The method for monitoring usage of system resources of claim 11, further comprising the steps of:

executing a dynamic discovery operation to identify a current location of a current collecting server on the network and reading job details from the database in the current collecting server.

15. The method for monitoring usage of system resources of claim 11, further comprising the steps of:

forwarding the job instructions and job data of a resource job from a client system to a local resource accessible to the client system, capturing the job instructions and job data transmitted to the local resource and job result information returned by the local resource, extracting the job attribute information from the captured job instructions and job data, and forwarding the job attribute information and job result information to the resource server.

16. The method for monitoring usage of system resources of claim 11, further comprising the steps of:

forwarding the job instructions and job data of a resource job to a local resource accessible to the client system, capturing the job instructions and job data transmitted to the local resource and job result information returned by the local resource, and forwarding the job instructions, job data and job result information to the resource server.

17. The method for monitoring usage of system resources of claim 11 wherein the resource is a printer, the resource job is a print job and the job instructions and job data of the resource job are printing instructions and document data.

18. The method for monitoring usage of system resources of claim 11, wherein the job result information comprises an indication of whether the print job has been successfully printed.

19. The method for monitoring usage of system resources of claim 18, wherein the job result information comprises a message indicating a time of receipt of the resource job by the resource and a time of completion of imaging of the resource job.

20. The method for monitoring usage of system resources of claim 19, wherein the job result information comprises information regarding an amount of a consumable used to image the resource job.

21. In a networked computer system including at least one client system, a print server and at least one printer accessible to the print server wherein the at least one client system and the print server are interconnected by a communications network and wherein a client system includes a processor for executing an application program for issuing a print job including print instructions for printing a document file and document data to be printed to the print server, the print server being responsive to a print job for directing the print instructions and document data to a printer accessible to the print server being responsive to the print instructions and document data for providing corresponding job result information to the print server, a system resource usage monitoring system, comprising:

in the print server, a job processor for forwarding the print instructions and document data of a print job to a printer accessible to the print server, and extracting job attribute information from the print job wherein the job attribute information includes information identifying system resources to be used in executing the print job, a resource agent for receiving job attribute information from the job processor and job result information returned from the printer wherein the job result information identifies the results achieved by the printer in response to the print job, and forwarding the job attribute information and the job result information to a resource collecting server, the resource collecting server including a resource collector for receiving the job attribute information and the job result information and generating corresponding job detail information representing system resources used in executing the print job, a database for storing the job details, and wherein the resource agent includes a dynamic discovery function for identifying a current location of a current resource collecting server on the network, for transmitting job attribute information and job result information to the current resource collecting server.

22. The resource usage monitoring system of claim 21, further comprising:

a resource manager system communicating with the resource collecting server through the network for reading the job details from the database and providing the job details to a user of the resource manager system for monitoring resource usage.

23. The resource usage monitoring system of claim 21, wherein:

the system resource manager includes a dynamic discovery function for identifying a current location of the current resource collecting server on the network, for reading job details from the database in the current resource collecting server.

24. The resource usage monitoring system of claim 21, wherein:

a client system further includes a local printer accessible to the client system, wherein the client system transmits the print instructions and document data of a print job to the local printer, and a job capture mechanism for capturing the print instructions and document data transmitted to the local printer and job result information returned by the local printer, extracting the job attribute information from the captured print instructions and document data, and forwarding the job attribute information and job result information to the print server.

25. The resource usage monitoring system of claim 21, wherein:

a client system further includes a local printer accessible to the client system, wherein the client system transmits the print instructions and document data of a print job to the local printer, and a job capture mechanism for capturing the print instructions and document data transmitted to the local printer and job result information returned by the local printer, and forwarding the print instructions, document data and job result information to the print server.

* * * * *